(12) United States Patent
Umemoto et al.

(10) Patent No.: US 6,751,023 B2
(45) Date of Patent: Jun. 15, 2004

(54) OPTICAL FILM

(75) Inventors: Seiji Umemoto, Osaka (JP); Toshihiko Ariyoshi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/774,618

(22) Filed: Feb. 1, 2001

(65) Prior Publication Data

US 2001/0012159 A1 Aug. 9, 2001

(30) Foreign Application Priority Data

Feb. 2, 2000 (JP) ..................... P2000-025365

(51) Int. Cl.[7] .................. G02B 5/02; G02B 6/06; F21V 8/00
(52) U.S. Cl. .................. 359/599; 359/831; 349/62; 362/31; 385/116
(58) Field of Search .................. 359/599, 707, 359/431, 831–837; 349/59–64; 362/31; 385/116

(56) References Cited

U.S. PATENT DOCUMENTS

| | | | |
|---|---|---|---|
| 5,183,597 A | 2/1993 | Lu | 264/64 |
| 5,341,231 A | 8/1994 | Yamamoto et al. | 349/64 |
| 5,390,276 A * | 2/1995 | Tai et al. | 385/146 |
| 5,485,291 A | 1/1996 | Qiao et al. | 349/64 |
| 5,584,556 A * | 12/1996 | Yokoyama et al. | 362/31 |
| 5,671,994 A | 9/1997 | Tai et al. | 362/31 |
| 5,712,694 A | 1/1998 | Taira et al. | 349/9 |
| 5,727,107 A | 3/1998 | Umemoto et al. | 385/116 |
| 5,808,713 A * | 9/1998 | Broer et al. | 349/98 |
| 5,897,184 A | 4/1999 | Eichanlaub et al. | 349/64 |
| 5,945,209 A | 8/1999 | Okazaki et al. | 428/304.4 |
| 5,961,198 A | 10/1999 | Hira et al. | 362/31 |
| 6,044,196 A | 3/2000 | Winston et al. | 388/146 |
| 6,060,183 A | 5/2000 | Higashi et al. | 428/701 |
| 6,147,732 A | 11/2000 | Aoyama et al. | 349/112 |
| 6,196,692 B1 | 3/2001 | Umemoto et al. | 362/31 |
| 6,236,439 B1 | 5/2001 | Saiki et al. | 349/117 |
| 6,322,236 B1 | 11/2001 | Campbell et al. | 362/333 |
| 6,369,950 B1 * | 4/2002 | Umemoto | 359/628 |
| 6,384,881 B1 | 5/2002 | Arai et al. | 349/65 |
| 2001/0009474 A1 | 7/2001 | Umemoto et al. | 359/485 |
| 2001/0010630 A1 | 8/2001 | Umemoto | 362/31 |
| 2001/0011779 A1 | 8/2001 | Stover | 264/17 |
| 2001/0012158 A1 | 8/2001 | Umemoto et al. | 359/599 |
| 2001/0053029 A1 | 12/2001 | Umemoto et al. | 359/599 |

FOREIGN PATENT DOCUMENTS

| | | | |
|---|---|---|---|
| EP | 867 747 | * 9/1998 | 349/64 |
| JP | 5-158033 | 6/1993 | |
| JP | 09-297222 | 11/1997 | |
| JP | 10-106328 | 4/1998 | |
| JP | 11-142618 | 5/1999 | |
| JP | 2000-147499 | 5/2000 | |
| WO | WO 97/01610 | 1/1997 | |
| WO | WO 97/30373 | 8/1997 | |
| WO | WO 97/47467 | 12/1997 | |

OTHER PUBLICATIONS

Patent Abstracts of Japan 05–158033.
Patent Abstracts of Japan 2000–147499.

* cited by examiner

*Primary Examiner*—Thong Nguyen
(74) *Attorney, Agent, or Firm*—Sughrue Mion, PLLC (57) ABSTRACT

An optical film including a transparent film having a hard coating layer provided on one side thereof, the hard coating layer including a repetitive prismatic structure having formed therein optical-path changing slopes oriented substantially toward certain directions at an angle of 35 to 48 degrees relative to the transparent film, and an adhesive layer laid on the other surface of the transparent film.

15 Claims, 5 Drawing Sheets

OPTICAL FILM

BACKGROUND OF THE INVENTION

1. Field of the Invention

The present invention relates to an optical film which has superior durability, efficiently changes the optical path of light having entered from a sidewise direction to a viewing direction, and enables formation of a slim, lightweight, bright, and easily-viewable transmission-type or dual-purpose reflection-and-transmission-type liquid-crystal display device.

The present application is based on Japanese Patent Application No. 2000-25365, which is incorporated herein by reference.

2. Description of the Related Art

With a view toward preventing an increase in the weight of a TV set or a personal computer display, which would otherwise be caused in association with an increase in the size of the TV set or the personal computer display, or toward miniaturizing a portable personal computer or a cellular phone, demand exists for a slimmer and lighter-weight transmission-type liquid-crystal display device. Against such a backdrop, difficulty is encountered in miniaturizing a related-art liquid-crystal display device with direct backlight or a related-art liquid-crystal display device with backlight of a side light-guide plate. In the case of a liquid-crystal display device with direct backlight, a light-scattering plate and a reflector are disposed immediately below a liquid-crystal display panel, and the display device usually has a thickness of about 4 mm or more. Even in the case of a liquid-crystal display device with backlight of a side light-guide plate, a thickness of 1 mm or more is required for effecting light transmission. If a light-scattering plate, a reflector, and a prism sheet are laid on the display device, the thickness of the display device assumes a thickness of 3 mm or more.

There has also been known a dual-purpose reflection-and-transmission liquid-crystal device which has a half-transmission type reflector interposed between a liquid-crystal display panel and a backlight and enables viewing under external light in a reflection mode. The half-transmission type reflector is intended for enabling viewing in a reflection mode. Without use of the half-transmission type reflector, the view under external light in the reflection mode becomes dark, thereby rendering the reflection-type liquid-crystal display device substantially nonfunctional. However, use of the half-transmission type reflector results in an increase in the weight of the liquid-crystal display device. Moreover, as a result of light being separated into transmitted light and reflected light by means of the half-transmission type reflector, the view in a transmission mode becomes dark. Further, the view in the reflection mode also becomes dark, and the brightness of the view falls short of the brightness of view obtained by a reflection layer of high reflectivity specifically designed for only a reflection purpose.

Figure 12:
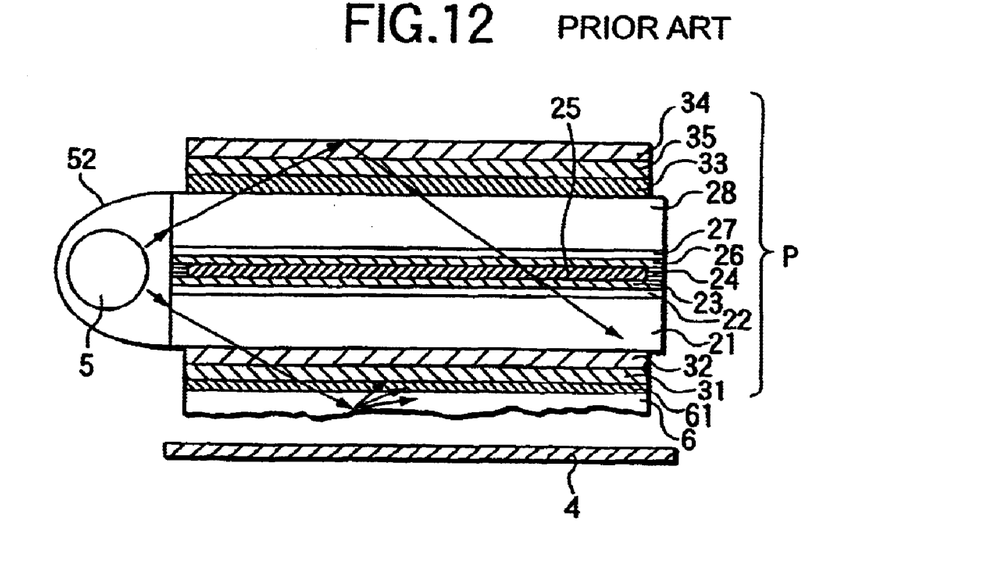
FIG. 12 is a descriptive view showing a related-art liquid-crystal display device.

FIG. 12 illustrates a film of scattering and reflection type, such as a scattering sheet 6 having rough surfaces. Unexamined Japanese Patent Publication No. Hei. 5-158033 describes a reflection-type liquid-crystal display device, in which illumination light is caused to enter from the side surface of a liquid-crystal display panel, and the thus-entered light is subjected to total reflection by a viewing-side cell board. The thus-reflected light is subjected to scattering on a rough reflector, and the scattered light is utilized for display.

In this case, the light which can be utilized for display is light which is emanated from the panel after having been scattered and which has not been subjected to total reflection. Scattered light usually exhibits a normal distribution showing a peak in the direction of regular reflection (the $20^{th}$ Liquid-Crystal Forum Lecture Proceedings 3 G510, Tohoku University, UCHIDA Hitoshi). The display light is tilted sharply relative to the front direction (i.e., the vertical direction), and effective utilization of such light for display is difficult. Hence, dark display appears in the front direction. Even if the scattering characteristic of the rough reflector is made more intensive, the amount of light which exits in the front direction in a reflection mode is decreased. Such light is also unfavorable for display (SID 96 DIGEST pp. 149 to 152). In the liquid-crystal display device utilizing the scattering and reflection characteristics of the rough surface, the intensity of scattering required in the transmission mode is contrary to that required in the reflection mode. Hence, difficulty is encountered in achieving a single intensity of scattering satisfying both modes.

SUMMARY OF THE INVENTION

The present invention is aimed at developing an optical film which efficiently changes the optical path of light having entered from a sidewise direction to a viewing direction and which enables formation of a slim, lightweight, bright, and easily-viewable transmission-type or dual-purpose reflection-and-transmission liquid-crystal display device.

The present invention provides an optical film that has a transparent film having a hard coating layer provided on one side thereof, the hard coating layer including a repetitive prismatic structure having formed therein optical-path changing slopes oriented substantially toward certain directions at an angle of 35 to 48 degrees relative to the transparent film; and an adhesive layer laid on the other surface of the transparent film.

If the optical film according to the present invention is placed on a view surface of a liquid-crystal display panel having an illumination device disposed on the side thereof, the optical path of light having entered from the side or the optical path of transmitted incident light is efficiently changed to the viewing direction of the liquid-crystal display panel by way of the optical-path changing slopes formed in the optical film, thus effectively utilizing the light for liquid-crystal display. Thus, there can be formed a slim and lightweight liquid-crystal display device providing good display quality. By means of forming a flat plane between the optical-path changing slopes, external light can be efficiently introduced into the liquid-crystal display panel. The incident light is subjected to reflection by way of a reflection layer. Thus, the incident light can be utilized for liquid-crystal display in a reflection mode. In addition to the transmission mode mechanism, there can also be formed a reflection mode mechanism. Consequently, there can be formed a slim, lightweight, and bright dual-purpose reflection-and-transmission liquid-crystal display device which provides superior display quality.

The above-described advantage is primarily ascribable to an optical film which controls an optical path by means of slope reflection. The light having entered from the side or transmitted incident light is subjected to reflection by way of the optical-path changing slopes, whereby the optical path of the light can be changed with superior directivity. Accordingly, good view can be achieved in a transmission mode. Further, a flat plane can be readily formed between the optical-path changing slopes. External light is caused to transmit through the flat plane, thus ensuring entrance of a sufficient amount of external light. Good view is achieved even in a reflection mode.

Thus, the optical film according to the present invention—which controls an optical path by means of slope reflection—primarily utilizes light appearing in the direction of regular reflection in which a peak appears, thus controlling an optical path of reflected light. Hence, directivity useful for display; particularly, directivity in the front direction, can be readily imparted to reflected light. Thus, a bright transmission mode can be achieved. Even in a reflection mode, efficient entrance, reflection, and transmission of external light can be ensured by means of utilization of flat plane sections of the optical film other than the optical-path changing slopes. Hence, the optical film according to the present invention can readily attain a balance of advantageous brightness between the reflection mode and the transmission mode. The optical-path changing slopes are formed in a hard coating layer, and hence the slopes are less vulnerable to flaws and can sustain an optical-path changing function over a long period of time. Flaws may scatter transmitted incident light and are apt to cause uneven illumination or brightness lines.

Features and advantages of the invention will be evident from the following detailed description of the preferred embodiments described in conjunction with the attached drawings.

DETAILED DESCRIPTION OF THE PREFERRED EMBODIMENTS

The present invention provides an optical film that includes a transparent film having a hard coating layer provided on one side thereof, the hard coating layer including a repetitive prismatic structure having formed therein optical-path changing slopes oriented substantially toward certain directions at an angle of 35 to 48 degrees relative to the transparent film; and an adhesive layer laid on the other surface of the transparent film. An example optical film is shown in FIGS. 1A through 1H. Reference numeral 1 designates an optical film; 11 designates a transparent film; 12 designates an adhesive layer; 13 designates a hard coating layer having a repetitive structure having optical-path changing slopes A1; that is, optical-path changing means A; and 14 designates a release liner.

Figure 9:
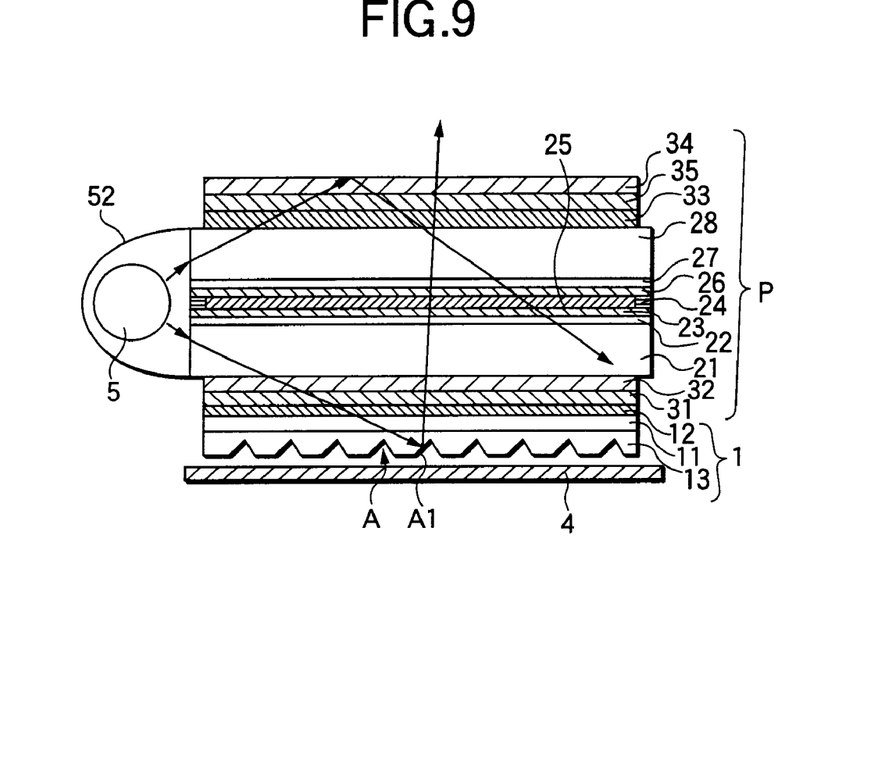
FIG. 9 is a descriptive cross-sectional view showing a transmission-type (dual-purpose reflection-and-transmission type) liquid-crystal display device.

As shown in FIG. 9, an illumination device 5 is disposed on the side surface of a liquid-crystal display panel P. The optical film 1 is placed on a viewing surface of the liquid-crystal display panel P. The light having entered from the illumination device 5 in a sidewise direction or transmitted incident light is reflected in the direction designated by arrows by way of the optical-path changing slope A1. As a result, the optical path of the light is changed toward the non-slope surface of the transparent film 11. The light is then caused to exit the transparent film 11 in the viewing direction of the liquid-crystal display panel P. The thus-outgoing light can be utilized as illumination light (display light) of the liquid-crystal display panel.

The transparent film 11 is to act as a support base material of the optical-path changing means and may be formed from appropriate material which exhibits transparency for the wavelength of light introduced into the optical film by way of the illumination device 5. For visible light, there may be employed transparent resin typified by acrylic resin or polycarbonate-based resin, cellulose-based resin or norbornane-based resin, and norbornen-based resin; and curable resin which can be polymerized by means of radiation such as heat, UV-rays, and electrons. More preferably, there may be employed material exhibiting little or no birefringence. There may be a case where internal stress arises within the transparent film 11 by means of bonding operation. In terms of preventing occurrence of retardation, which would otherwise be caused by internal stress, material having low photoelasticity is preferably used.

Figure 2:
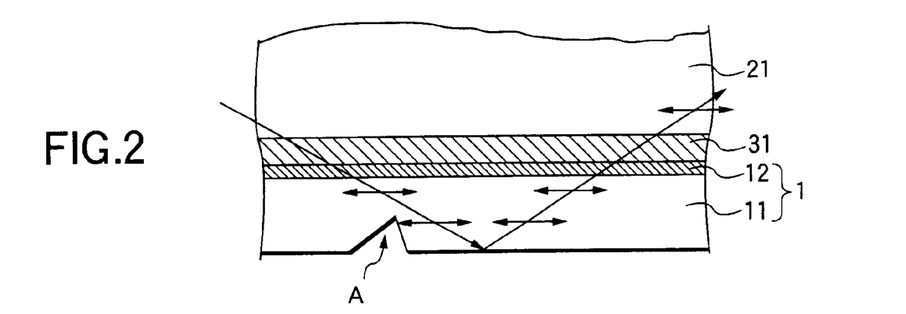
FIG. 2 is a descriptive view showing a transmission state of polarized light.
Figure 3:
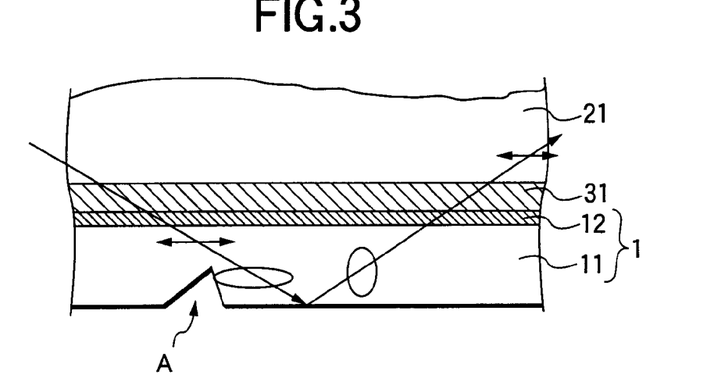
FIG. 3 is a descriptive view showing another transmission state of polarized light.

In view of formation of a liquid-crystal display device which involves little display unevenness, as a result of suppressing luminance unevenness and chromaticity unevenness, there is preferably used a transparent film involving a low degree of in-plane mean retardation, such as that mentioned previously; more preferably, a transparent film involving retardation of 30 nm or less. So long as the transparent film 11 is formed from a film of low retardation, as illustrated in FIG. 2, when linearly-polarized light enters the optical film 1 by way of a polarizer 31, the polarized state of light can be sustained properly, thus preventing deterioration of display quality. In a case where the transparent film 11 is formed from a common polyester film, the film exhibits retardation of about 2,000 nm. When linearly-polarized light enters a film of high retardation by way of the polarizer 31, as shown in FIG. 3, light may assume rainbow colors under the influence of retardation, depending on an incident angle or a reflection angle. Alternatively, the polarized state of light may be changed, in which case transmission efficiency and output efficiency are deteriorated. Accordingly, unevenness in luminance and chromaticity is prone to arise. In terms of prevention of display unevenness, in-plane mean retardation of a transparent film is preferably 20 nm or less; more preferably, 15 nm or less; and particularly preferably, 10 nm or less. Preferably, local variations in retardation are minimized.

In consideration of the fact that the angle at which transmitted light enters a transparent film is apt to exceed 45 degrees, light is susceptible to mean retardation of the transparent film in its thicknesswise direction, as in the case of in-plane mean retardation, as mentioned previously. In terms of prevention of display unevenness, mean retardation in a thicknesswise direction preferably assumes a value of 50 nm or less, more preferably a value of 30 nm or less, and particularly preferably a value of 20 nm or less. A transparent film of low retardation may be formed by means of removing internal optical distortion of the film through annealing of, for example, an existing film. A preferable method of forming a transparent film is a method of forming a film of low retardation by means of the casting technique. The only requirements are that retardation requirements for a transparent film be satisfied within a range in which the film is to be used for effecting display on an optical film. Hence, there is no necessity for satisfying retardation requirements over the entire optical film. Preferably, the retardation is based on light in a visible range; particularly, light having a wavelength of 550 nm.

Figure 1A:
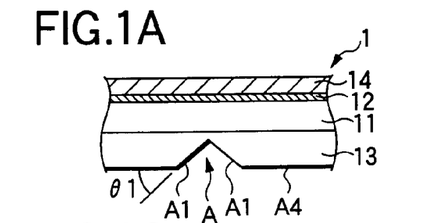
FIGS. 1A through 1H are descriptive side views showing examples of optical films (optical-path changing slopes)
Figure 1B:
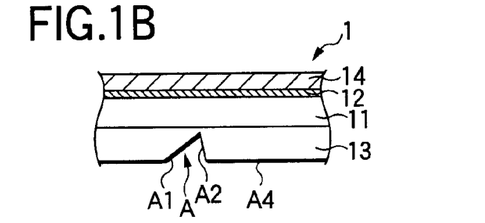
Figure 1C:
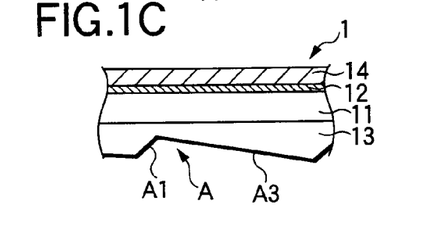
Figure 1D:
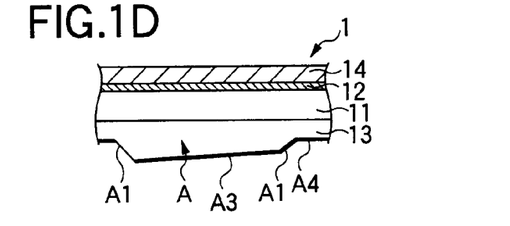
Figure 1E:
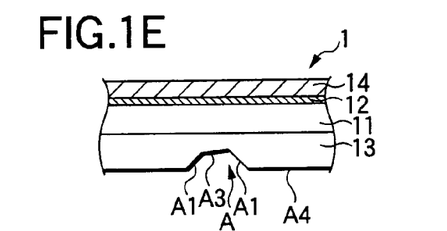
Figure 1F:
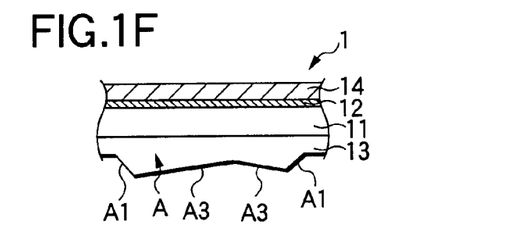
Figure 1G:
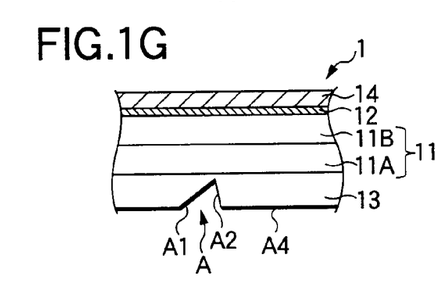
Figure 1H:
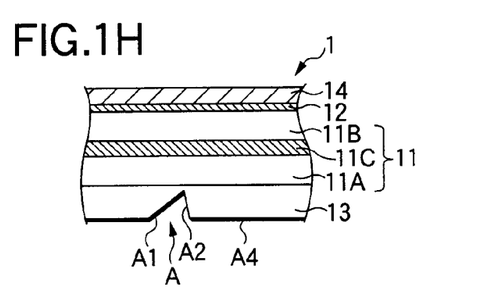

Preferably, in order to control retardation, the transparent film 11 is formed as a multilayer member of two or more layers 11A and 11B of homogeneous or heterogeneous resin as shown in FIG. 1G. As shown in FIGS. 1A through 1F, there is no necessity for forming a transparent film as an integral single-layer object consisting of one type of material. The transparent film may be formed from a polarizer, as shown in FIG. 1H. Any polarizer may be used, and no particular limitation is imposed on the type of the polarizer. In order to achieve a display of good contrast ratio by means of entrance of highly-intensive linearly-polarized light, there may be preferably employed a polarizer having a high level of polarization; for example, an absorption-type polarization film 11C or a polarization film 11C having transparent protective layers 11A and 11B imposed on one or both sides thereof. The polarization film is formed by means of causing a hydrophilic macromolecular film, such as a polyvinyl-alcohol-based film, a partial formal-polyvinyl-alcohol-based film, or an ethylene-vinyl-acetate-copolymer-based partially-saponificated film, to adsorb iodine or a two-tone substance such as a two-tone dye; and drawing the thus-adsorbed film.

During formation of the transparent protective film, a film having superior transparency, mechanical strength, thermal stability, and a moisture-shielding characteristic is preferably used. For example, there may be used any one selected from the group comprising polymers such as acetate-based resin, polyester-based resin, polyether-sulphone-based resin, polycarbonate-based resin, polyamide resin or polyimide resin, polyolefine-based resin or acrylic-based resin, polyether-based resin or polyvinyl chloride, styrene-based resin or norbornane-based resin; and thermosetting-type resins or UV-setting-type resins such as acrylic hardening resin, urethane-based hardening resin, acrylic-urethane hardening resin, epoxy hardening resin, or silicon-based hardening resin. The transparent protective layer can be affixed to the transparent film 11.

The thickness of a transparent film may be determined in view of requirements. However, in terms of demand for a thinner film, the thickness of a transparent film is 300 μm or less, preferably 5 to 200 μm, and more preferably 10 to 100 μm. In a case where the transparent film 11 is formed from a polarizer, as mentioned above, at least a polarizer to be disposed on the same surface of the transparent film 11 on which an optical film is to be placed can be omitted during formation of a liquid-crystal display device. As a result, the transparent film can be made thinner, and hence the thickness of the transparent film is not limited to the values set forth and may comply with the thickness of a related-art polarizer.

As illustrated in FIGS. 1A through 1H, the hard coating layer 13 is placed on one side of the transparent film 11 of the optical film 1. In order to achieve the previously-set objective, the hard coating layer 13 has optical-path changing slopes A1 for changing the optical path of light having entered the film in a sidewise direction or transmitted incident light toward a predetermined direction by means of reflection. In this case, in order to obtain illumination light exhibiting superior directivity toward the front direction by means of optical-path changing, the transparent film 11 has a prismatic structure having optical-path changing slopes A1 oriented substantially toward certain directions and inclined at an angle θ1 ranging from 35° through 48° relative to the film surface A4; that is, a repetitive structure of optical-path changing means A, as shown in FIGS. 1A through 1H.

FIGS. 1A through 1H show examples of optical-path changing means A having the optical-path changing slopes A1. FIGS. 1A through 1C, 1G, and 1H show optical-path changing means A of substantially-triangular cross section; FIGS. 1D and 1E show optical-path changing means A of substantially-quadrangular cross section; and FIG. 1F shows optical-path changing means A of a pentagonal cross section. More specifically, FIG. 1A shows optical-path changing means A having two optical-path changing slopes A1 arranged, in conjunction with the surface of the layer 13, into an isosceles triangle. FIGS. 1B, 1G and 1H show optical-path changing means A having an optical-path changing slope A1 and a steep slope A2 which is greater in angle of tilt than the optical-path changing slope A1. FIG. 1C shows a repetitive structure which is formed on the entirety of one surface of the transparent film and in which optical-path changing means A are continuously formed adjacently, wherein one optical-path changing slope A1 and a corresponding gentle slope A3 constitute a unit. Further, FIGS. 1A through 1C, 1E, 1G, and 1H show optical-path changing means A consisting of recesses (grooves), whereas FIGS. 1D and 1F show optical-path changing means A consisting of protuberances (projections).

As mentioned in the example, the optical-path changing means can be formed in a recess or protuberance consisting of equilateral surfaces or slopes of equal tilt angle, a recess or protuberance consisting of an optical-path changing slope and a steep or gentle slope, or a recess or protuberance consisting of slopes of different tilt angles. Slope geometries can be determined in accordance with the number and positions of sidewise directions, as required. Preferably, the optical-path changing means is formed from a recess rather than from a protuberance, so that the optical-path changing means is protected from flaws, thereby improving flaw-resistance of the optical-path changing slope and maintaining the function thereof.

From the viewpoint of achieving a certain characteristic, such as directivity toward the front direction, the substantially-certain direction toward which the optical-path changing slope A1 is oriented opposes a sidewise direction from which light is to enter. Accordingly, as shown in FIG. 10, when light is introduced into the optical film from two or more sidewise directions, there is preferably employed an optical film which has optical-path changing slopes A1 corresponding to the number and positions of the sidewise directions.

Figure 10:
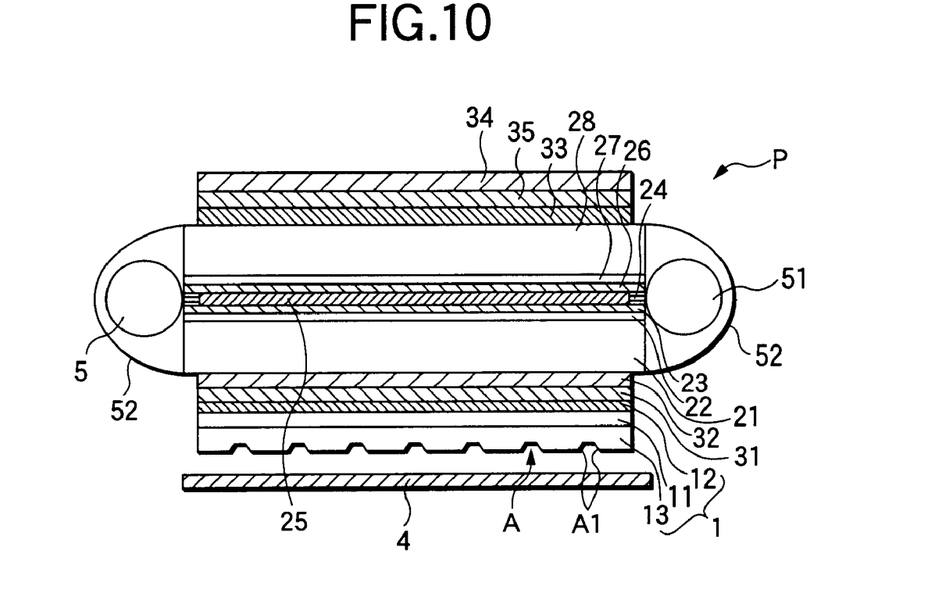
FIG. 10 is a descriptive cross-sectional view showing a transmission-type liquid-crystal display device having light introduced from at least two directions.

As shown in FIG. 10, in a case where light enters an optical film from two mutually-opposing side surfaces of the optical film, there is preferably employed the optical film 1 comprising the optical-path changing means A shown in FIG. 1A or the optical film 1 comprising the optical-path changing means A shown in FIGS. 1D, 1E, and 1F. The optical-path changing means A shown in FIG. 1A consists of two optical-path changing slopes A1 arranged so as to assume a substantially-isosceles-triangle cross section. In contrast, the optical-path changing means A shown in FIG. 1D consists of two optical-path changing slopes A1 arranged so as to assume a substantially-trapezoidal cross section. The optical-path changing means A shown in FIG. 1E consists of two optical-path changing slopes A1 arranged so as to assume a substantially-quadrangular cross section. The optical-path changing means A shown in FIG. 1F consists of two optical-path changing slopes A1 arranged so as to assume a substantially-pentagonal cross section. The ridge lines of the optical-path changing slopes A1 are parallel with the sidewise direction(s). Preferably, the optical film 1 comprises two or more optical-path changing slopes A1 such that, when one of the slopes is taken as a reference, the remaining slope(s) are oriented in the direction mirroring that of the reference.

In a case where light enters the optical film from two adjacent side surfaces thereof (i.e., the longitudinal and lateral side surfaces of the optical film), there is preferably employed an optical film including optical-path changing slopes A1 such that the ridge lines of the slopes are parallel with the longitudinal and lateral directions, respectively. In a case where light enters the optical film from three or more side surfaces (i.e., the longitudinal and lateral side surfaces and mutually-opposing side surfaces), there is preferably employed an optical film having the optical-path changing means A1 of several types set forth in combination.

As mentioned previously, the optical-path changing slope A1 plays a role of reflecting, among light rays entering from sidewise directions or transmitted incident light, the light having entered the slope A1, thus changing the optical path of the thus-reflected light. In this case, as shown in FIG. 1A, the optical-path changing slope A1 is tilted at an angle θ1 of 35° to 48° relative to the surface of the optical film 1. As a result, the optical path of the light having entered from a sidewise direction or transmitted incident light is changed at substantially right angles to the surface of the optical film, whereby there can be efficiently obtained illumination light that is well directed toward the front.

At an angle of tilt smaller than 35°, the optical path of the reflected light greatly diverts at an angle of 30° or more from the front direction. Accordingly, effective utilization of reflected light becomes difficult, and brightness in the front direction is deteriorated. In contrast, at an angle of tilt of greater than 48°, requirements for subjecting, to total reflection, the light having entered from sidewise directions or transmitted incident light are not satisfied. Accordingly, the amount of light which leaks from the optical-path changing slope increases, thus deteriorating efficient utilization of the light having entered the optical film from a sidewise direction. In view of the optical-path changing toward the front direction with good directivity and suppression of leak light, the angle of tilt θ of the optical-path changing slope A1 preferably ranges from 38° to 45°, more preferably 40° to 44°, in consideration of total reflection requirements for transmitted light in accordance with refraction based on Snell's law.

The optical-path changing means A having the optical-path changing slopes A1 is formed as a repetitive prismatic structure for the purpose of rendering the optical film thinner. The light having entered the optical film from a sidewise direction is reflected rearward, to thereby efficiently transmit the incident light toward the opposite side surface. As a result, the entire surface of the optical film is illuminated immediately and uniformly. To these ends, the optical-path changing means A is preferably constructed so as to comprise a gentle slope A3 inclined at 5° or less, preferably 4° or less, and particularly preferably 3° or less relative to the surface of the optical film. Alternatively, the optical-path changing means A preferably includes a flat plane A4 having an angle of tilt of substantially 0° or a flat plane consisting of film surface A4. In the case of the optical-path changing means A including the steep slope A2 shown in FIGS. 1B, 1E, 1G, and 1H, the angle of the steep slope is preferably set to 35° or more, preferably an angle of 50° or more, and particularly preferably an angle of 60° or more, thereby increasing the width of the film surface A4.

When the reflection layer 4 is placed on the back of the optical film 1, as shown in FIGS. 9 and 10, the gentle slope A3 or the flat plane formed from the film surface A4 can act as an incident section in which external light is to enter or as a transmission section for permitting transmission of the incident light having been reflected by the reflection layer 4. As a result, the illumination device enables display in a reflection mode in which the illumination device is extinguished. Thus, there can be formed a dual-purpose reflection-and-transmission liquid-crystal display device.

In this case, when the optical-path changing means A consisting of the slopes A1 and A3 is formed iteratively as shown in FIG. 1C, the angle of tilt of the gentle slope A3 relative to a film surface assumes 5° or less, preferably 4° or less, and particularly preferably 3° or less over the entire optical film. Moreover, a difference of inclination angle between the close gentle slopes preferably assumes an angle of 0.3° or less and particularly preferably assumes an angle of 0.1° or less. The reason for this is to prevent occurrence of a great change in the optical path of the light having been reflected by the gentle slope A3; particularly, occurrence of a great change in inclined angle between the closest gentle slopes. The same also applies to the optical-path changing means comprising the slopes A1 and A3 shown in FIG. 1F.

In order to realize a bright display, the areas or the widths on one surface of the optical film occupied by the gentle slopes A3 inclined at an angle of less than five degrees relative to the surface of the optical film or by the flat planes A4 are preferably set so as to become ten times or more, preferably twelve times or more, particularly preferably fifteen times or more, the areas occupied by the slopes A1 and A2 inclined at an angle of 35 degrees or more. This is intended for improving the efficiency of incidence of external light and the efficiency of transmission of the light having been reflected from the reflection layer.

Figure 4:
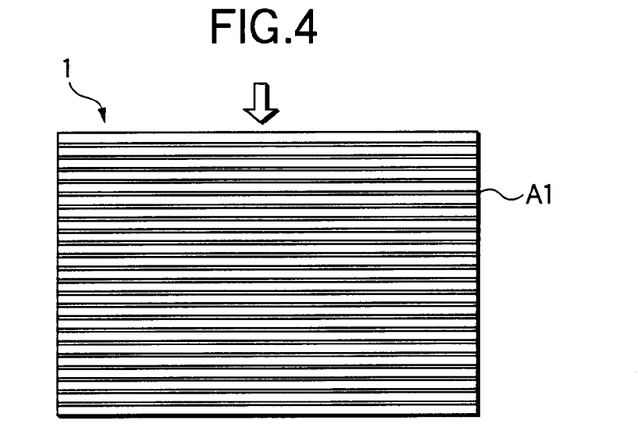
FIG. 4 is a descriptive plan view showing an optical-path changing slope.
Figure 5:
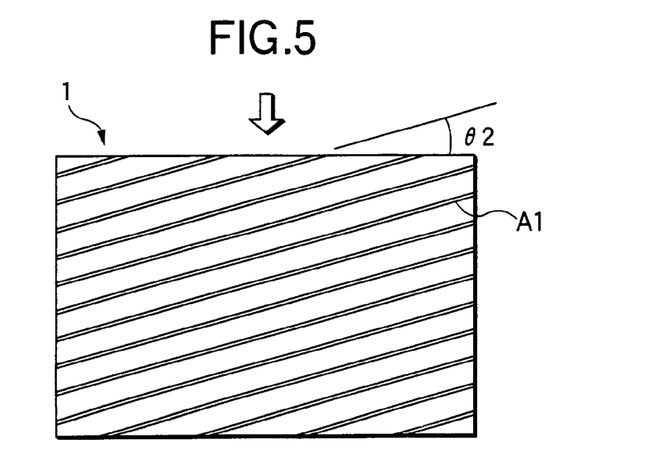
FIG. 5 is a descriptive plan view showing another optical-path changing slope.
Figure 6:
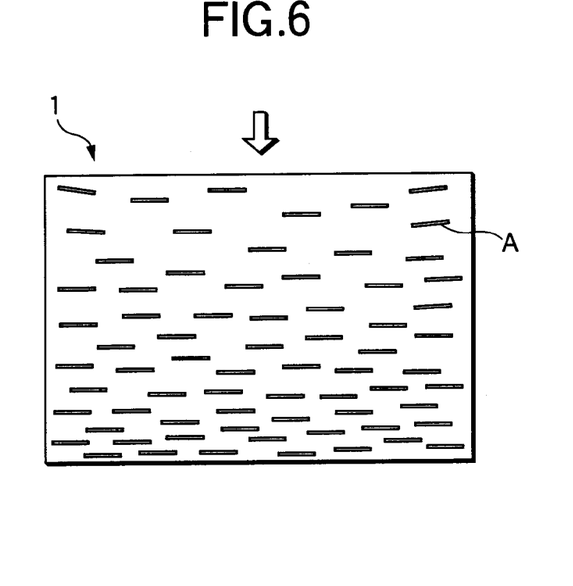
FIG. 6 is a descriptive plan view showing still another optical-path changing slope.

As shown in FIGS. 4 through 6, in a case where the ridge lines of the optical-path changing means A are arranged parallel to or inclined with respect to the sidewise direction in which light enters, the optical-path changing means A may be formed continuously across the optical film 1, as shown in FIGS. 4 and 5, or independently and intermittently across the optical film 1, as shown in FIG. 6. In a case where the optical-path changing means A is formed independently, the groove structures are formed such that the lengths of grooves or the lengths of prismatic structures formed from protuberances in the sidewise direction become five times or more the depths or heights of the groove or the depths or heights of prismatic structures, in view of efficiency of incidence of transmitted light and efficiency of optical-path changing means A. The lengths of the grooves or those of prismatic structures preferably assume a value of 500 µm or less, more preferably a value of 10 µm to 480 µm, and particularly preferably a value of 50 µm to 450 µm, in view of uniform illumination of the optical film. In addition, the areas on one surface of the optical film occupied by the independent grooves are 10% or less the total surface area of the film.

A slope constituting the optical-path changing means A may be formed from a required plane geometry, such as a linear plane, a refraction plane, or a curved plane. No particular limitations are imposed on the cross-sectional geometry of the optical-path changing means A or a pitch at which the optical-path changing slope A1 is to be repeated. The optical-path changing slopes A1 determine the brightness of the liquid-crystal display during the transmission (illumination) mode. Hence, the optical-path changing slopes A1 can be determined in accordance with the evenness of illumination on the optical film or evenness of illumination in the external-light mode of the dual-purpose reflection-and-transmission liquid-crystal display device, as required. The amount of light whose optical paths have been changed can be controlled in accordance with a distribution density of the optical-path changing slopes.

Figure 7:
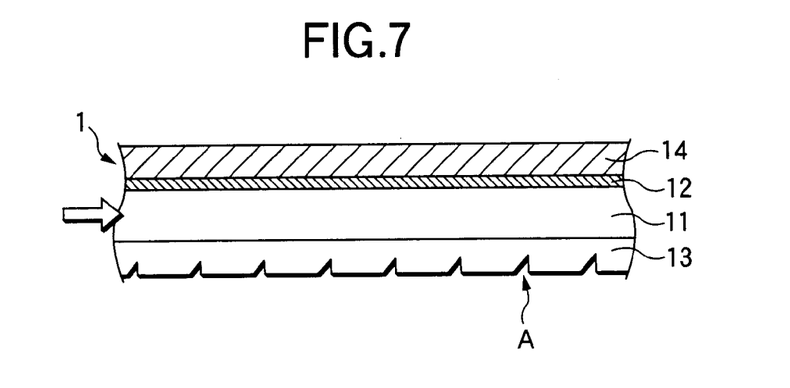
FIG. 7 is a descriptive side view showing another optical film example.
Figure 8:
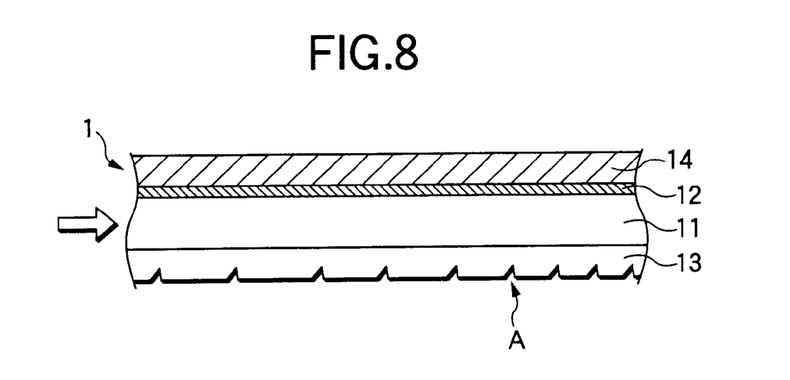
FIG. 8 is a descriptive side view showing still another optical film example.

Hence, the slopes A1, A2, and A3 may be of constant geometry over the entire surface of the optical film. Alternatively, in order to make uniform the illumination of the optical film so as to compensate for absorption loss or attenuation of transmitted light induced by previous the optical-path changing of the transmitted light, the pitch of the optical-path changing means A may be made larger with increased distance from the side surface by way of which light enters the optical film, as shown in FIG. 7. Alternatively, the optical-path changing means A may be provided at constant pitches, as shown in FIGS. 4 and 5. Further, pitches of the optical-path changing means A may be made gradually narrower with increasing distance from the side by way of which light enters the optical film, as shown in FIGS. 6 and 8. Alternatively, the optical-path changing means A may be formed at random pitches, thereby rendering illumination on the optical film uniform. Random pitches are also preferable in terms of prevention of occurrence of moiré, which would otherwise be caused by interference between pixels. Hence, the optical-path changing means A may be formed in combination with groove structures differing in pitches and shapes. In FIGS. 4 through 8, the direction designated by arrows denotes the direction in which light is to be transmitted.

When a dual-purpose reflection-and-transmission liquid-crystal display device is formed, an overlap exists between the optical-path changing slope A1 and a pixel of the liquid-crystal display panel, with the result that the optical film transmits the display light insufficiently, which may in turn result in an unnatural display. In order to prevent such an unnatural display, minimizing the area of an overlap between the optical-path changing slopes A1 and pixels and ensuring sufficient light transmissivity of the flat planes A3 and A4 are desirable. In this respect, the optical-path changing slope A1 is formed to an area of 40 $\mu$m or less, preferably an area of 3 to 20 $\mu$m, and more preferably an area of 5 to 15 $\mu$m with respect to the width of projection on the film surface, in consideration of the fact that pixels are usually formed on the liquid-crystal display panel at a pitch of 100 to 300 $\mu$m. Since a coherent length of a fluorescent tube is usually set to a value of 20 $\mu$m or thereabouts, the width of projection is preferable for preventing deterioration of display quality, which would otherwise be caused by diffraction.

In this respect, the interval between the optical-path changing slopes A1 is preferably wide. However, as mentioned previously, the optical-path changing slope is substantially a functional block for generating illumination light by means of changing the optical path of light having entered from a sidewise direction. Hence, if the interval between the optical-path changing slopes A1 is excessively wide, illumination during an illumination mode becomes less intensive, thus resulting in an unnatural display. Preferably, the pitch at which the optical-path changing slopes A1 are to be repeated is set to a value of 5 mm or less, preferably a value of 20 $\mu$m to 3 mm, and particularly preferably a value of 50 $\mu$m to 2 mm.

In the case of the optical-path changing means formed in the repetitive prismatic structure, there may arise a case where the repetitive structure of the optical-path changing means interferes with pixels of the liquid-crystal display panel, thus inducing moiré. Moiré can be prevented by means of controlling the pitch of the repetitive structure. However, as mentioned above, there exists a preferable range for the pitch of the repetitive structure. Hence, there is a necessity for determining a solution for moiré which can arise within the range of pitch. In the present invention, the ridge lines of the prismatic structures are formed so as to become inclined against the sidewise direction such that the repetitive prismatic structures can cross pixels, as shown in FIG. 5, thereby preventing occurrence of moiré.

If the angle $\theta 2$ of tilt of the ridge line relative to the sidewise direction is excessively large, the light which has been reflected by the optical-path changing slope A1 is susceptible to deflection. As a result, the direction in which the optical path of the light is to be changed is greatly deflected, making deterioration of display quality likely. For this reason, the ridge lines are inclined with respect to the sidewise direction at an angle $\theta 2$ of $\pm 30°$ or less, preferably an angle of $\pm 25°$ or less, and particularly preferably an angle of $\pm 20°$ or less. Symbol $\pm$ designates the directions in which the ridge lines are to be inclined with reference to the sidewise direction. When no moiré arises, because of low resolution of a liquid-crystal display panel, or when moiré is negligible, the ridge lines are preferably made as parallel as possible with the sidewise direction.

The hard coating layer having the optical-path changing means formed therein can be formed by any of the following methods, as required. One method is to apply, in the form of a pattern, liquid resin—which can be polymerized by means of radiation such as heat, UV-rays, or electrons—to a transparent film. Another method is to polymerize the liquid resin—which can be polymerized by means of radiation such as heat, UV-rays, or electron—by filling or drawing the resin into a mold capable of forming the resin into a predetermined shape and to bond the thus-polymerized resin to the transparent film. If the transparent film has a thermosetting characteristic, the hard coating layer can be formed by means of an appropriate method such as a method of thermocompression bonding. A preferable method comprises the steps of, for example, applying liquid resin—which can be polymerized by means of radiation such as heat, UV-rays, or electrons—to one surface of a transparent film; bringing the thus-coated surface of the transparent film into intimate contact with the surface of a metal mold having predetermined prismatic structures formed thereon and exposing the coated layer to UV-rays or radiation; and exfoliating the transparent film from the metal mold. Thus, a hard coating layer having a repetitive prismatic structure of optical-path changing slopes formed therein is affixed to one surface of a transparent film by means of a metal mold having predetermined repetitive prismatic structures formed thereon.

The hard coating layer having the optical-path changing means formed therein may be formed from an appropriate material which exhibits transparency for the wavelength of light having entered from the illumination device and which enables formation of a layer harder than the transparent film.

In general, there is employed a sol-gel material including inorganic material and resin which can be polymerized by means of radiation such as heat, UV-rays, or electrons. If a great difference in refractive index exists between the hard coating layer having the optical-path changing means formed therein and the transparent film, the output efficiency of light is greatly deteriorated by means of boundary reflection. In order to prevent such deterioration of output efficiency, minimizing the difference between the refractive index of the hard coating layer and that of the transparent film is preferable. Preferably, the difference in refractive index falls within a value of 0.10 or less, particularly preferably a value of 0.05 or less. In this case, in terms of output efficiency, the refractive index of the hard coating layer should preferably be made greater than that of the transparent film. In view of this consideration and those that have been mentioned previously, preferable material used for forming the hard coating layer is acrylic-urethane UV-setting resin or polysilane-based sol-gel material.

As shown in FIG. 1A–H, the optical film has the adhesive layer 12 attached to the surface of the transparent film 11 having no hard coating layer 13 formed thereon. The adhesive layer 12 is to be used for affixing the optical film to a support member such as a liquid-crystal display panel. Bonding of the optical film to a support member by way of an adhesive layer is intended for improving the efficiency of reflection of light from the optical-path changing slopes A1 of the optical-path conversion means A, and, by extension, for improving the brightness of the liquid-display panel by means of effective utilization of light having entered from a sidewise direction. During formation of the adhesive layer 12, there may be employed an adhesive containing, as base polymer, one member selected from the group consisting of rubber-based polymer, acrylic polymer, vinylalkylether-based polymer, silicon-based polymer, polyester-based polymer, polyurethane-based polymer, polyether-based polymer, polyamide-based polymer, and styrene-based polymer. Preferably, there is used an adhesive having superior transparency, weather resistance, and heat resistance, such as an acrylic adhesive containing, as base polymer, polymer primarily consisting of alkylester-acrylate or alkylester-methacrylate.

Figure 11:
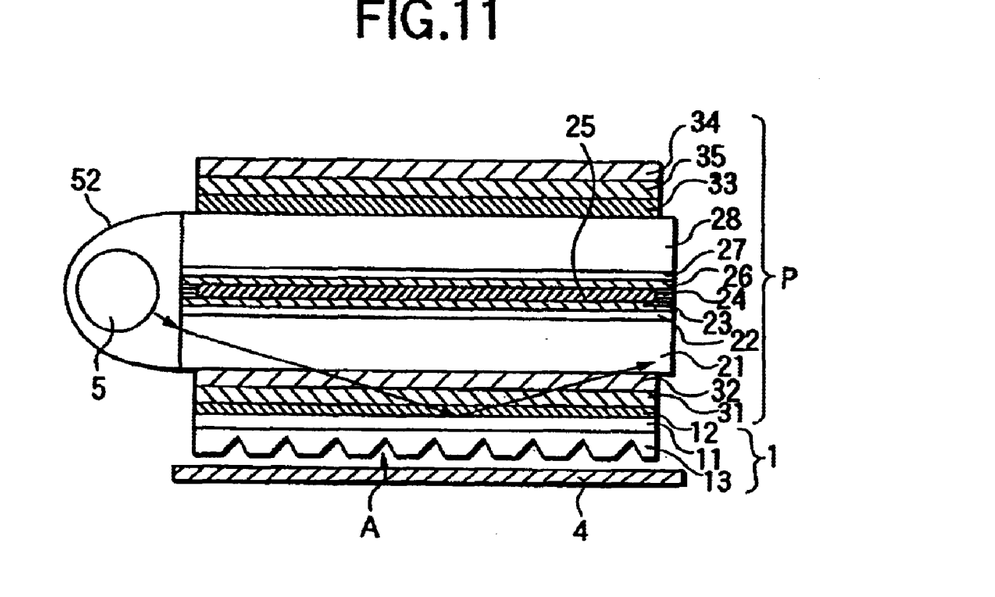
FIG. 11 is a descriptive view showing the relationship between a refractive index and an optical path.

The present invention prevents confinement of light within an optical film, which would otherwise be caused by boundary reflection due to difference in refractive index between layers of the optical film, as designated by arrows shown in FIG. 11. In order to reduce the amount of light which becomes unable to leave the optical film and becomes a loss, there is preferably employed an adhesive layer which differs in refractive index from the transparent film by a value of 0.10 or less, preferably a value of 0.08 or less, and particularly preferably a value of 0.05 or less. Further, the adhesive layer may be formed to be of optical-diffusion type by means of comprising one type or two or more types of inorganic conductive/non-conductive particles of, for example, silica, alumina, titania, zirconia, oxidized tin, oxidized indium, oxidized cadmium, and antimony oxide; or organic particles such as cross-linked polymer or non-cross-linked polymer. Until the adhesive layer is used in practice, the release liner 14 is temporarily affixed to the adhesive layer 12 for preventing extraneous matter from adhering to the adhesive layer 12, as shown in FIGS. 1A through 1H. For the same reasons as those mentioned previously, the adhesive layer preferably differs in refractive index from a support member, such as the liquid-crystal display panel, by a value of 0.15 or less, preferably a value of 0.10 or less, and particularly preferably a value of 0.05 or less.

In the optical film, the surface of the hard coating layer having the optical-path changing slopes formed therein may be coated with a base material, such as a sheet, for protecting the optical-path changing slopes. As shown in FIGS. 9 and 10, the surface of the hard coating layer 13 having the optical-path changing slopes formed therein may be closely covered with a reflection layer 4. Such a reflection layer 4 is intended for improving the efficiency of utilization of light, by means of causing the light leaked from the surface having the optical-path changing slopes formed herein to re-enter the optical-path changing slopes by means of reverse reflection, as well as for forming a dual-purpose reflection-and-transmission liquid-crystal display device.

The reflection layer can be formed from a white sheet, as required, in the same manner as in the background art. For example, the reflection layer is preferably embodied by a coated layer formed by means of impregnating binder resin with high-refractive-index metal, such as aluminum, silver, gold, copper, or chromium, or with metal-alloy powder of such metal; by a layer to which the metal or a dielectric multilayer film is added by means of an appropriate thin-film formation method, such as the vacuum-deposition method or the sputtering method; by a reflection sheet formed by means of supporting the coated layer and associated layers thereof with a base material made of a film; or a high-refractive-index reflection layer made of metal foil. Such a reflection layer is preferable particularly for forming a dual-purpose reflection-and-transmission liquid-crystal display device.

The reflection layer to be formed may exhibit a light-scattering function. So long as reflected light is scattered by means of a scattering-reflection surface, the directivity of the light toward the front direction can be improved. Further, if the reflection layer is roughened, there is prevented occurrence of a Newton ring, which would otherwise be caused when the reflection layer is brought into intimate contact with the hard coating layer, thus improving the visibility of the optical film.

The light-scattering-type reflection layer can be formed according to a method of roughening the surface of material by means of, for example, sand blasting or mat-finishing, or according to a method of forming fine prismatic structures in the surface of a film base material, by means of an appropriate method such as a particle doping method, and placing on the film base material a reflection layer on which the minute prismatic structures are reflected. The reflection layer—on which the minute prismatic structures formed in the surface of a film base material are reflected—can be formed by means of labeling metal on the film base material according to an appropriate method; for example, deposition methods such as the vacuum deposition method, the ion plating method, and the sputtering method or a plating method, as required.

The optical film according to the present invention changes the optical path of the light having entered from an illumination device disposed in a sidewise direction or transmitted incident light to a vertical direction favorable to viewing, by way of optical-path changing slopes. Thus, the optical film enables efficient exit of light and exhibits a superior transmission characteristic for external light. As illustrated in FIGS. 9 and 10, the optical film is placed on the back or front side of the liquid-crystal display panel P having the illumination devices 5 and 51 disposed on one or two or more sides surfaces thereof. Thus, the present invention enables formation of various devices, such as a bright and easy-to-view transmission-type liquid-crystal display device and a dual-purpose illumination-and-external-light liquid-crystal display device which exhibits a superior low-power-consumption characteristic.

In the liquid-crystal display device set forth, the majority of the light having entered from the illumination device in a sidewise direction is transmitted toward a rear direction by means of reflection determined by the law of refraction, by way of a lower cell board 21 and an upper cell board 28, and in accordance with the proportions of thicknesses of respective layers of the liquid-crystal display panel. As a result, the light—which has been prevented from exiting (leaking) from the surface of the display panel and has entered the optical-path changing slopes A1 of the optical film 1—is efficiently subjected to optical-path changing and is efficiently oriented toward the rear direction with respect to the viewing direction. Further, the remaining light rays are transmitted toward a rear direction by means of total reflection, and the thus-reflected light rays enter the optical-path changing slopes A1 disposed in the rear direction. Here, the light rays are efficiently subjected to optical-path changing and efficiently oriented toward the rear direction with reference to the viewing direction. Accordingly, there can be achieved display with uniform brightness over the entire surface of the panel display screen.

The liquid-crystal display panel P is of transmission type and has at least a liquid-crystal cell. As illustrated in FIGS. 9 and 10, the liquid-crystal display panel P has at least a liquid-crystal cell which is formed by means of sealing liquid crystal 25 between the cell boards 21 and 28 by way of a sealant 24. The light having entered the liquid-crystal display panel P by way of the optical film 1 is subjected to control by means of the liquid crystal 25, and the resultant light exits the other side of the optical film as display light. No particular limitation is imposed on the type of the liquid-crystal display panel P.

Specific examples of liquid-crystal cell include TN liquid-crystal cells, STN liquid-crystal cells, IPS liquid-crystal cells, HAN liquid-crystal cells, twisted or non-twisted cells such as OCB liquid-crystal cells or VA liquid-crystal cells, guest-host liquid-crystal cells, ferroelectric liquid-crystal cells, and light-scattering-type liquid-crystal cells. Further, a method of driving liquid crystal may also be an appropriate method; for example, the active matrix method or the passive matrix method. Liquid crystal is usually activated by means of a transparent electrode 27 or a reflection-type electrode 22 interposed between the pair of cell boards (21 and 28), as illustrated in FIGS. 9 and 10.

An appropriate board, such as a glass board or a resin board, can be used as the cell board. In terms of display quality, a board is preferably made of optically-isotropic material. Further, from the viewpoint of improving brightness or display quality, a board preferably has superior transparency, as does a no-alkali glass plate to be placed on a blue glass plate. Moreover, in terms of a lightweight characteristic, a resin board is preferable. No limitation is imposed on the thickness of the cell board; the thickness of the cell board can be determined in accordance with the strength at which liquid crystal is to be sealed into the liquid crystal display panel, as required. The thickness of the cell board usually assumes a value of 10 $\mu$m to 5 mm, preferably a value of 50 $\mu$m to 2 mm, and more preferably a value of 100 $\mu$m to 1 mm, in consideration of attaining a balance between light transmission efficiency, compactness, and lightweight construction.

During formation of a liquid-crystal cell, there may be provided one appropriate function layer or two or more appropriate function layers, such as an oriented film made of a rubbed film for orienting liquid crystal or a color filter for color display purpose, as required. As illustrated, an oriented film 23 is usually formed on the electrode 22, and an oriented film 26 is usually formed on the electrode 27. A non-illustrated color filter is usually provided between the cell board 21 and the transparent electrode 22 or between the cell board 28 and the transparent electrode 27.

As in the case of the example shown in FIGS. 9 and 10, the liquid-crystal panel P may be formed by means of adding to the liquid crystal cell one or more appropriate optical layers, such as polarizers 31 and 34, retarders 32 and 33, and a light-scattering layer. The polarizer is intended for realizing a display utilizing linearly-polarized light, as in the case of the optical film (shown in FIG. 1H) using polarizers with the transparent film. As illustrated, any appropriate polarizers may be used.

Polarizers to be used; particularly, a polarizer to be provided on the view side, may be subjected to non-glaring processing or anti-reflection processing for preventing hindrance of the view, which would otherwise be caused by surface reflection of external light. Non-glaring processing can be effected by means of rendering the surface of a polarizer minutely prismatic by means of the roughening method, such as the sand-blasting method or the embossing method, or by means of the method of blending transparent particles, such as silica, with the surface.

Further, anti-reflection processing can be effected by means of the method of forming a coherent deposition film. Non-glaring processing and anti-reflection processing can also be effected as a method of bonding to the liquid-crystal display panel a film having a minutely prismatic surface or a coherent film. As illustrated, the polarizer can be provided on both sides or on one side of the liquid-crystal cell.

The retarder is intended for improving display quality by means of compensating for retardation due to the double refraction of liquid crystal. The light-scattering layer is intended for enlarging a display range by means of scattering display light, averaging brightness by means of leveling bright-line emission by way of slopes of the optical film, and increasing the amount of light entering the optical film by means of scattering the light having been transmitted through the liquid-crystal display panel.

As a retarder, there may be employed a birefringent film which is formed by means of drawing the polymer films exemplified as preferable transparent films by means of an appropriate method, such as the uniaxial or dual-axis orientation method; an oriented film of appropriate liquid crystal polymer such as nematic or discotic liquid-crystal polymer; or an oriented layer supported by a transparent base material, as required. Alternatively, there may be employed a thermal contraction film whose thicknesswise refractive index has been controlled by heating and application of contraction force.

As illustrated, the retarders 32 and 33 for compensation purpose are usually interposed between the polarizers 31 and 34 disposed on the view side and/or the rear side and a liquid-crystal cell, as required. Appropriate retarders may be used as the retarders 32 and 33 in accordance with wavelength. Further, a multilayer retarder consisting of two or more layers may also be used for controlling the optical characteristic of the retarder, such as retardation.

The light-scattering layer can be provided by means of an appropriate method, as in the case of the coating layer—which has minute prismatic structures formed on the surface thereof in the same manner as for the non-glare layer—or a scattering sheet. Like the adhesive layer 12 having transparent particles blended therein, the light-scattering layer can be disposed as an adhesive layer 35 which affixes the polarizer 34 to the retarder 33. As a result, the optical film can be made slimmer. The light-scattering layer can be provided outside the polarizer (i.e., at a position closer to the view side than to the polarizer). However, so long as the light-scattering layer is provided at a position closer to the liquid-crystal cell than to the polarizer 34, external light enters the light-scattering layer after having been absorbed by the polarizer, thereby preventing reflection loss, which would otherwise be caused by a back-scattering phenomenon occurring when the light directly enters the light-scattering layer.

The illumination device to be disposed on the side surface of the liquid-crystal panel is intended for introducing light, which is to be utilized as illumination light for a liquid-crystal display device, from a sidewise direction of the liquid-crystal display panel. By combination of the illumination device with an optical film to be disposed on the back or front of the liquid-crystal display panel, the liquid-crystal display device can be miniaturized. An appropriate illumination device can be employed, as required. Preferably, there is employed an illumination device; for example, a linear light source such as a (cold or hot) cathode-ray tube; a point light source such as a light-emission diode; an array member in which point light sources are arranged linearly or in a plane; or an illumination source which is formed from a combination of a point light source and a linear light source and converts incident light originating from the point light source into a linear light source by means of a linear light guide plate.

As illustrated in FIGS. 9 and 10, the illumination devices 5 and 51 can be disposed on one side surface or two or more side surfaces of the liquid-crystal display panel P. When illumination devices are disposed on two or more side surfaces, the side surfaces may be a combination of mutually-opposing side surfaces, as shown in FIG. 10, or a combination of longitudinal and lateral side surfaces crossing each other. Moreover, the illumination device may be disposed on three or more side surfaces through use of these two types in combination.

The illumination device enables a view in the transmission mode in which the illumination device is to be illuminated. When a dual-purpose reflection-and-transmission liquid-crystal display device is viewed under external light in an external mode, there is no necessity for illumination. Hence, the illumination device is switchable between illumination and extinction. An arbitrary method may be employed for effecting such switching. Any one of related-art methods may be employed. Here, the illumination device may be of heterochromatic-illumination type which can switch illumination colors, or may be arranged so as to be able to effect heterochromatic illumination by way of illumination devices of different types.

If necessary, the illumination devices 5 and 51 may be used in combination with appropriate auxiliary means, such as a reflector 52 enclosing the illumination device for guiding divergent rays toward the liquid-crystal display panel P, as illustrated. A resin sheet provided with a metal thin film of high reflectivity, a white sheet, or a metal foil may be used as the reflector 52. The reflector 52 can also be used as fixing means which encloses the illumination device by means of the end of the reflector 52 being bonded to the cell board of the liquid-crystal display panel.

In the present invention, optical elements or components constituting the liquid-crystal display device, such as liquid-crystal cells, polarizers, and retarders, may be, wholly or in part, integrated, stacked, fixed, or arranged in a separable manner. In terms of prevention of deterioration of contrast, which would otherwise be caused by boundary reflection, the optical elements are preferably fixed. An appropriate transparent adhesive, such as a tacky agent, can be used for hermetic fixing of optical elements. Further, there may be embodied an adhesive layer having a scattering function, by means of causing the transparent layer to contain the previously-described transparent particles.

The optical elements or components, particularly optical elements or components to be disposed on the view side of the display device, can be imparted with a UV-absorption function by means of processing the elements or components through use of UV absorbing agent; for example, ester-salicylate-based compounds, benzophenone-based compounds, benzotriazole-based compounds, cyanoacrylate-based compounds, and nickel-complex-salt-based compounds.

EXAMPLES

Example 1

Acrylic UV-hardening resin (Aronix UV-3701 produced by Toagosei Co., Ltd.) was filled into a metal mold which had been formed into a predetermined geometry beforehand, by means of dripping through use of a dropping pipet. Triacetil-cellulose (TAC) film (whose surface has been saponificated) of 80 $\mu$m thickness was placed stationary on the hardening resin. The film and the resin were brought into intimate contact with each other by means of a rubber roller, thereby eliminating excessive resin and air bubbles. The thus-contacted film and resin were set upon exposure to UV rays emitted from a metal halide lamp. The thus-set resin and film were removed from the metal mold and chopped into predetermined sizes. As a result, there was produced a film, wherein a hard coating layer—which has a refractive index of 1.533 and optical-path changing means formed thereon—is brought into intimate contact with one surface of the transparent film of TAC having a refractive index of 1.49. An adhesive layer having a refractive index of 1.47 was provided on the surface of the film having no optical-path changing means formed therein, thus producing an optical film. A reflection layer formed from a silver deposition film was provided on the surface of the optical film having the optical-path changing means formed thereon.

The optical film has a mean in-plane retardation of 5 nm and a thicknesswise retardation of 44 nm. Further, the optical film has a width of 50 mm and a depth of 45 mm. Continuous grooves whose ridge lines are parallel with each other in the widthwise direction of the film were formed at a pitch of 220 $\mu$m. The angle of tilt of the optical-path changing slope A1 assumes a value of about 43°, and the optical-path changing slope A1 has a width of 10 to 16 $\mu$m. The apex angle between the steep slope A2 and the slope A1 is 65°. Further, the optical film has an optical-path changing means (see FIG. 1B). In this changing means, the area of the flat plane section (A4) is 10 times or more the total sum of the area on the film surface in which the optical-path changing means is projected and the area on the film surface in which the steep slope is projected.

Next, a light-scattering film—which is formed by means of causing an adhesive layer containing fine resin particles to adhere to a TAC film—was bonded to a view-side of a commercially-available TN-type liquid-crystal cell. A polarizer was affixed to the front and reverse side of the cell, thus constituting a normally-white transmission-type TN liquid-crystal display panel. A cold cathode-ray tube was disposed on the side of the display panel, and a reflector made of a silver-deposited reflection sheet was disposed so as to surround the cathode-ray tube. The two ends of the cathode-ray tube were bonded to the upper and lower surfaces of the panel, whereby the cathode-ray tube was fixed. Subsequently, the optical film was bonded to the polarizer placed on the view side of the display panel by way of the adhesive layer, such that the optical-path changing slopes were oriented opposing and in parallel with the cathode-ray tube, thus completing a liquid-crystal display device.

Comparative Example 1

A liquid-crystal display device was produced in the same manner as in Example 1, except for the following processes. Namely, a hard coating layer was formed through use of a metal mold having a scattering surface formed thereon by means of sand blasting. There was produced an optical film having an in-plane mean retardation of 5 nm and a thicknesswise mean retardation of 47 nm. The liquid-crystal display device was produced through use of the thus-produced optical film.

Comparative Example 2

A liquid-crystal display device was produced in the same manner as in Example 1, except for the following processes. Namely, there was produced an optical film in which the angle of tilt of the optical-path changing slope was about 30°. The liquid-crystal display device was produced through use of the thus-produced optical film.

Comparative Example 3

A liquid-crystal display device was produced in the same manner as in Example 1, except for the following processes. Namely, a TAC film of 80 μm thickness was placed in a metal mold, and the metal mold was heated to 220° C. Optical-path changing means were transferred to the TAC film by means of vacuum heat pressing. The thus-produced optical film was used for manufacturing the liquid-crystal device in the same manner as in Example 1.

Evaluation Tests

The brightness of a center on the front screen of each of the liquid-crystal display devices manufactured in Examples and Comparative Examples was examined through use of a luminance meter (Topcon, BM7), while the devices were held in a transmission mode in which the cold cathode-ray tube was illuminated without application of a voltage to the liquid-crystal display panel. Further, the optical film was bonded to a glass plate, and the surface of the optical film having the optical-path changing means formed thereon was subjected to a pencil hardness test.

Evaluation results are provided in the following table.

|  | Ex. 1 | Co. 1 | Co. 2 | Co. 3 |
|---|---|---|---|---|
| Front Brightness (cd/m$^{2)}$ | 23 | 4 | 8 | 26 |
| Pencil Hardness | 2-3H | 3-4H | 2-3H | HB |

As can be seen from the table, Example 1 and Comparative Example 3 achieved front brightness greater than that achieved by Comparative Examples 1 and 2. In Comparative Examples 1 and 2, light was emitted in the direction opposite the light source, and hence brightness in the front direction was insufficient. Thus, the outgoing light contributed less to display. Particularly, in Comparative Example 1, outgoing light was scarce in all directions. Even when a voltage was applied to the liquid-crystal display panels, good display quality was obtained in Example 1 and Comparative Example 3. In Example 1, when the light-scattering sheet was removed from the display device, the ease of view became worse as compared to the case where the light-scattering sheet was bonded to the display device. However, in terms of front brightness, no significant difference was found between the case where the light-scattering sheet was attached and the case where the light-scattering sheet was removed.

With regard to pencil hardness, Comparative Example 3 shows a result much worse than that yielded by Example 1 and those yielded by Comparative Examples 1 and 2. As shown in Example 1, so long as optical-path changing means are formed from a layer harder than the transparent film, flaw-resistance of the optical-path changing means can be improved. Thus, the Example has provided a bright view. Hence, the present invention is understood to have achieved a slimmer and lighter-weight liquid-crystal display device using a film while avoiding an increase in the weight and size of the liquid-crystal display device; to have formed a liquid-crystal display device of good display quality; and to have enabled easy removal of stains.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An optical film comprising:
   a transparent film;
   a hard coating layer being provided on one surface thereof, the hard coating layer including a repetitive prismatic structure having formed therein optical-path changing slopes oriented substantially toward certain directions at an angle of 35 to 48 degrees relative to the transparent film; and
   an adhesive layer laid on the other surface of the transparent film,
   wherein the transparent film has a substantially uniform thickness of 300 μm or less.

2. An optical film according to claim 1, wherein the transparent film has an in-plane mean retardation of 30 nm or less; a difference between the refractive index of the transparent film and that of the adhesive layer is less than or equal to 0.1; and the adhesive layer is coated with a release liner.

3. An optical film according to claim 1, wherein the optical-path changing slopes oriented substantially toward certain directions are made up of two or more planes such that, if one of the planes is taken as a reference, the other plane is oriented as a mirror image of the reference.

4. An optical film according to claim 1, wherein the optical-path changing slopes are tilted at an angle of 38 through 45 degrees with respect to a surface of the optical film.

5. An optical film according to claim 1, wherein the optical-path changing slopes are embodied by groove structures substantially having cross sections of isosceles triangles or cross sections of other triangles.

6. An optical film according to claim 1, wherein the optical-path changing slopes are embodied by grooves or protuberant structures having substantially quadrangular cross sections or substantially pentagonal cross sections.

7. An optical film according to claim 1, wherein areas on one surface of the optical film occupied by flat planes which are inclined at an angle of less than five degrees relative to the surface of the optical film are ten times or more areas occupied by slopes inclined at an angle of 35 to 48 degrees.

8. An optical film according to claim 1, wherein a prismatic structure having optical-path changing slopes is formed from flat planes, areas on one surface of the optical film occupied by flat planes which are inclined at an angle of less than five degrees relative to the surface of the optical film being ten times or more areas occupied by slopes inclined at an angle of 35 to 48 degrees; and wherein the prismatic structure is based on a continuous groove which extends across the optical film and has a substantially-triangular cross section.

9. An optical film according to claim 1, wherein a prismatic structure having optical-path changing slopes is based on independent grooves having substantially triangular, quadrangular, or pentagonal cross sections; wherein the lengths of the independent grooves are five times or more the depths thereof; wherein the optical-path changing slopes are formed at an angle of tilt of 38 to 45° to the film surface; and wherein areas on one surface of the optical film occupied by the independent grooves are 10% or less the total surface area of the film.

10. An optical film according to claim 1, further comprising a reflection layer closely provided on the surface of the optical film on which the prismatic structure having the optical-path changing slopes formed thereon is formed.

11. An optical film according to claim 1, wherein ridge lines of the optical-path changing slopes are parallel with or inclined at an angle of ±30° with one side of the transparent film.

12. An optical film according to claim 1, wherein the adhesive layer is of light-scattering type.

13. An optical film according to claim 1, wherein the transparent film is a retarder.

14. An optical film according to claim 1, wherein the transparent film thickness is 5 to 200 µm.

15. An optical film according to claim 1, wherein the transparent film thickness is 10 to 100 µm.

* * * * *